(12) United States Patent
Jacobs et al.

(10) Patent No.: US 7,716,109 B1
(45) Date of Patent: May 11, 2010

(54) SYSTEM AND METHOD FOR WEB TRADING

(75) Inventors: David M. Jacobs, Wayne, NJ (US);
Imran Sayeed, Belmont, MA (US);
Greg Sabatino, Cambridge, MA (US);
Tarkington McMains, Charlestown, MA (US)

(73) Assignee: Citibank, N.A., New York, NY (US)

( * ) Notice: Subject to any disclaimer, the term of this patent is extended or adjusted under 35 U.S.C. 154(b) by 601 days.

(21) Appl. No.: 09/560,960

(22) Filed: Apr. 28, 2000

Related U.S. Application Data

(60) Provisional application No. 60/131,555, filed on Apr. 29, 1999.

(51) Int. Cl.
*G06Q 30/00* (2006.01)

(52) U.S. Cl. .............................. 705/37; 705/26; 705/27; 705/35; 705/36; 705/38; 705/39; 705/40

(58) Field of Classification Search .................... 705/26, 705/27, 37, 64, 67, 71, 72, 76, 35, 36, 39, 705/38, 40; 713/201, 154, 175, 182; 380/23, 380/24, 75

See application file for complete search history.

(56) References Cited

U.S. PATENT DOCUMENTS

| | | | | |
|---|---|---|---|---|
| 5,297,032 | A | 3/1994 | Trojan et al. | 364/408 |
| 5,729,594 | A * | 3/1998 | Klingman | 379/93.12 |
| 5,758,126 | A | 5/1998 | Daniels et al. | 395/500 |
| 5,889,863 | A | 3/1999 | Weber | 380/25 |
| 5,903,882 | A | 5/1999 | Asay et al. | 705/44 |
| 5,913,202 | A | 6/1999 | Motoyama | 705/35 |
| 5,963,923 | A | 10/1999 | Garber | 705/37 |

(Continued)

FOREIGN PATENT DOCUMENTS

JP 09-218903 8/1997

(Continued)

OTHER PUBLICATIONS

"Trading systems," Wall Street & Technology, vol. 16, No. 1, pp. 113-121, Jan. 1998;—[Non-Patent Literature Search Results from INSPEC (IEE/IEEE), NTIS, 1969-1990, Institute of Electrical Engineers, pp. 11, 14, and 16].

(Continued)

*Primary Examiner*—Nga B. Nguyen
(74) *Attorney, Agent, or Firm*—King & Spalding LLP

(57) ABSTRACT

The present invention relates to a web trading system and method for performing financial transactions securely over a public data network, such as the Internet, using a web browser as the user interface. The financial transactions are offered, for example, by a financial institution to its customers at the institution's web site. They include transactions such as foreign currency exchange, currency and money market trades, and warrant trades. The web trading system and method provide secure communication protocol between the Internet user interface and a virtual private network (VPN) of a financial institution to enable implementation of trading applications by the financial institution's application servers across the VPN. Security for the financial transactions is provided by the web trading systems and software downloaded to the customer's personal computer (PC) and includes encryption, authentication, authorization, message and transaction integrity capabilities, registration authority, handshake protocol, and firewalls.

23 Claims, 11 Drawing Sheets

U.S. PATENT DOCUMENTS

| | | | | |
|---|---|---|---|---|
| 6,016,476 | A | * | 1/2000 | Maes et al. .................. 705/1 |
| 6,105,131 | A | * | 8/2000 | Carroll ..................... 713/155 |
| 6,275,941 | B1 | * | 8/2001 | Saito et al. ................ 713/201 |
| 6,311,269 | B2 | * | 10/2001 | Luckenbaugh et al. ...... 713/154 |
| 6,408,282 | B1 | * | 6/2002 | Buist ...................... 705/36 R |
| 6,421,653 | B1 | * | 7/2002 | May ........................ 705/36 R |
| 7,020,632 | B1 | * | 3/2006 | Kohls et al. ................ 705/37 |

FOREIGN PATENT DOCUMENTS

| | | |
|---|---|---|
| JP | 10-243118 | 9/1998 |
| JP | 10-269078 | 10/1998 |
| JP | 11-085890 | 3/1999 |

OTHER PUBLICATIONS

"Portfolio accounting/management systems," Wall Street & Technology, vol. 11, No. 8, pp. 84-103,194, Year 1994 ([Non-Patent Literature Search Results from INSPEC (IEE/IEEE), NTIS, 1969-1990, Institute of Electrical Engineers, pp. 22 and 30].

"Portfolio accounting/management systems," Wall Street & Technology, vol. 10, No. 5, pp. 94-112, Jan. 1993—[Non-Patent Literature Search Results from INSPEC (IEE/IEEE), NTIS, 1969-1990, Institute of Electrical Engineers, p. 67].

Deidre, "Foreign exchange systems try to keep pace with a buzzing market," Computers in Banking, vol. 7, No. 9, pp. 23-26, 1990 [derived from INSPEC (IEE/IEEE), NTIS, 1969-1990, Institute of Electrical Engineers, pp. 11, 14, and 16, Sep. 1990—[Non-Patent Literature Search Results from INSPEC (IEE/IEEE), NTIS, 1969-1990, Institute of Electrical Engineers, pp. 141-147].

"Software (1990 Buyer's Guide Issue)," Wall Street & Te;chnology, vol. 7, No. 2, pp. 27-121, Nov. 1989 —[Non-Patent Literature Search Results from INSPEC (IEE/IEEE), NTIS, 1969-1990, Institute of Electrical Engineers, pp. 172 and 193].

Duffy, "Lan Ho! Networking systems come of age," Wall Street Computer Review, vol. 5, No. 12, pp. 29-35, Sep. 1998—[Non-Patent Literature Search Results from INSPEC (EE/IEEE), NTIS, 1969-1990, Institute of Electrical Engineers, p. 297].

"Vendor-sponsored director," Wall Street Computer Review, vol. 5, No. 8, pp. 42-55, May 1988—[Non-Patent Literature Search Results from INSPEC (IEE/IEEE), NTIS, 1969-1990, Institute of Electrical Engineers, p. 314].

* cited by examiner

SYSTEM AND METHOD FOR WEB TRADING

This application claims the benefit of U.S. Provisional Application No. 60/131,555 titled "SYSTEM AND METHOD FOR WEB TRADING", filed Apr. 29, 1999.

FIELD OF THE INVENTION

The present invention relates to automated financial transactions, and in particular to a system and method for performing automated financial transactions securely over the Internet using a web browser for the user interface.

BACKGROUND OF THE INVENTION

Financial institutions, such as banks, have a number of trading applications, such as applications for trading foreign exchange products. Typically, such trading applications are deployed over private networks, as opposed to the Internet using a web browser for the user interface. For example, the user interface that is the current implementation for products, such as foreign currency exchange products, is deployed through a private network, such as a virtual private network (VPN), as distinguished from the Internet.

Financial institution customers, however, want to have services, such as foreign currency exchange products, delivered through the Internet or web and to have the services available without having to access the financial institution's private network. The customers want to be able to view and actually interact with the application or service through a web browser over the Internet. At the same time, the customers want assurance that the financial transactions which they perform over the Internet are secure.

SUMMARY OF THE INVENTION

It is a feature and aspect of the present invention to provide a system and method for performing financial transactions with a financial institution, such as a bank, over the Internet.

It is another feature and aspect of the present invention to provide a system and method for performing financial transactions securely over the Internet.

It is an additional feature and aspect of the present invention to provide a system and method for performing financial transactions securely over the Internet, using a web browser for the user interface.

It is a further feature and aspect of the present invention to provide a system and method for performing financial transactions, such as foreign currency exchange, currency and money market trades, and warrant trades, securely over the Internet.

To achieve the stated and other features, aspects and objects, an embodiment of the present invention provides a method and system for performing financial transactions, such as foreign currency exchange, currency and money market trades, and warrant trades, which enables a financial institution, such as a bank, to deploy the services or trading applications, through the Internet. An application of the system includes a user interface portion which is written in a language that makes it suitable for deployment in a web browser and to work through the web. The system of the present invention also bridges the Internet user interface to back end server processes of the financial institution. In other words, the system for an embodiment of the present invention sits in the middle and brokers the communication protocol from Internet enabled protocols in the protocols formerly used, for example, on implementation of trading applications of the financial institution through a private network such as a virtual private network (VPN).

DETAILED DESCRIPTION OF THE INVENTION

Referring now to an embodiment of the invention, the system and method for securely performing financial transactions, such as foreign currency exchanges, currency and money market trades, and warrant trades, over a public data network (PDN), such as the Internet, makes use of encryption of data in transmission over networks. The financial transactions are offered, for example, by a financial institution to its customers at the institution's web site.

According to an embodiment of the present invention, the web trading system and method provide secure communication protocol between the Internet user interface at the customer's site and a virtual private network (VPN) of a financial institution to enable implementation of financial applications by the financial institution's application servers across the VPN. The customers referred to herein range from individuals to large entities such as corporations, fund managers and banks. The financial applications referred to herein include but not limited to: applications for electronic foreign-exchange trading, such as those described in U.S. Pat. No. 5,787,402, which is hereby incorporated by reference; applications for electronically matching and confirming currency and money market trades, providing settlement instructions, and/or performing allocations and splits, such as those described in U.S. Pat. No. 6,029,146, which is hereby incorporated by reference; and applications for allowing customers to remotely and electronically buy and sell warrants from sellers.

Security for the financial transactions over the Internet is provided by the web trading system and software downloaded to the customer's site or terminal, such as the customer's personal computer (PC). Confidential customer data and password and other security tokens and keys are protected using security capabilities, and hosts are also secured. Security capabilities include, for example, Secure Sockets Layer (SSL) and public key encryption technology, such as Entrust™. Hence, security for the financial transactions comprises various layers of protection including encryption, authentication, authorization, message and transaction integrity capabilities, registration authority, handshake protocol, and firewalls.

Figure 1A:
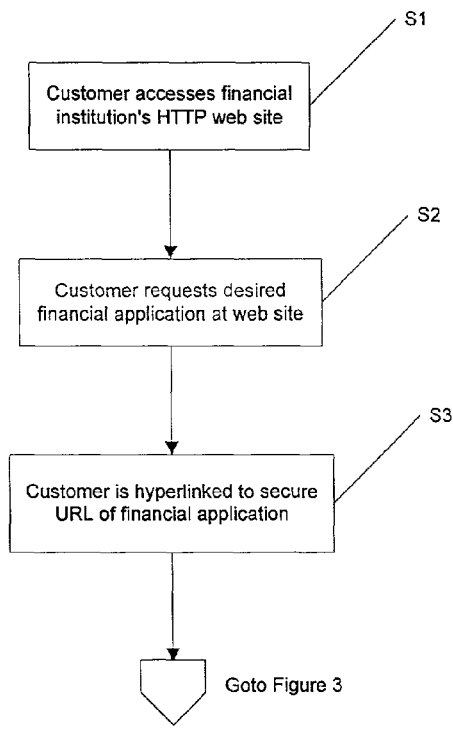
FIGS. 1A and 1B depict alternative procedures which a user/customer can initiate access to a desired financial application offered by a financial institution, according to embodiments of the present invention.
Figure 1B:
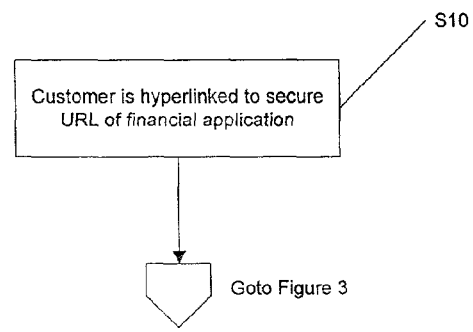

According to an embodiment of the present invention, as shown in FIG. 1A, the financial institution has a private web site or public web site, such as "www.crossmar.com". At S1, a customer at a terminal, such as a client computer or PC, uses HyperText Transport Protocol (HTTP) to access the web site and navigates, for example, through a hierarchy of pages that takes the customer to the financial institution's secured financial application capability, such as foreign currency exchange capability, via a hyperlink. In order to access the financial application capability, the customer clicks on an appropriate selection at S2, at which point the customer is hyperlinked to a secured Uniformed Resource Locator (URL) for connection to a secured web server containing the desired financial application at S3 and prompted to enter a user name and password for authentication. Alternatively, as shown in FIG. 1B, the secured financial application has its own secured URL which the customer can access via HyperText Transport Protocol Secure (HTTPS) at S10 for direct connection to the secured web server. The customer is then required to enter a user name and password for authentication and access to the financial application on the secured web server.

When the customer comes to the financial institution's web site or URL to access a financial application for the first time, i.e., the customer is a first-time user, the institution's server system initially authenticates the customer through a secure registration process. According to an embodiment of the present invention, the registration process includes the downloading of security software from the system to the customer's PC, such as digital signature and session encryption capabilities, certain Java class and dynamic link library (DLL) files, and keys for authentication and digital signature, that remain resident on the customer's PC. When the customer clicks on the hyperlink on subsequent visits to the web site, the preloaded security software on the customer's PC automatically undertakes most of the security functionality of the system, such as encryption of the session between the customer and the financial institution's application servers, and only changes that have occurred since the last visit are provided. The software downloaded to the customer's PC also provides the user interface.

Each subsequent time the customer comes to the web site to run the application, all runtime components will have been downloaded and are executing, and the system downloads, for example, a Java applet to the customer's PC, which prompts the customer for a user name and password. In response to the prompt, the customer enters the customer's user name and password. When the customer enters the information, it is encrypted by the system and sent back to a web server and back into the financial institution's application server environment, where it is used to authenticate the customer and to establish an encrypted session.

Upon a successful registration, the customer can access the financial institution's web site and start performing financial transactions. According to an embodiment of the present invention, when the customer is authenticated and the encrypted session is established, the customer is presented, for example, with a series of screens and a menu that give the customer choices for doing various things related to performing a financial transaction, such as trading foreign currency. For example, by inputting information in response to prompts on the customer's PC screen, the financial institution's currency exchange trading system identifies the nature of the transaction which the customer wants, automatically generates an offer in response to the customer's request, based on parameters, such as market price, the size and nature of the transaction, and the size and nature of the customer, and displays an offer to the customer on the customer's PC screen. The trading system gives the customer the option to accept or reject the offer or ask for an updated offer, and if the customer delays too long, the trading system automatically withdraws and updates the offer. If the customer accepts an offer, the trading system automatically executes the trade and displays a notification on the customer's PC screen.

Figure 2:
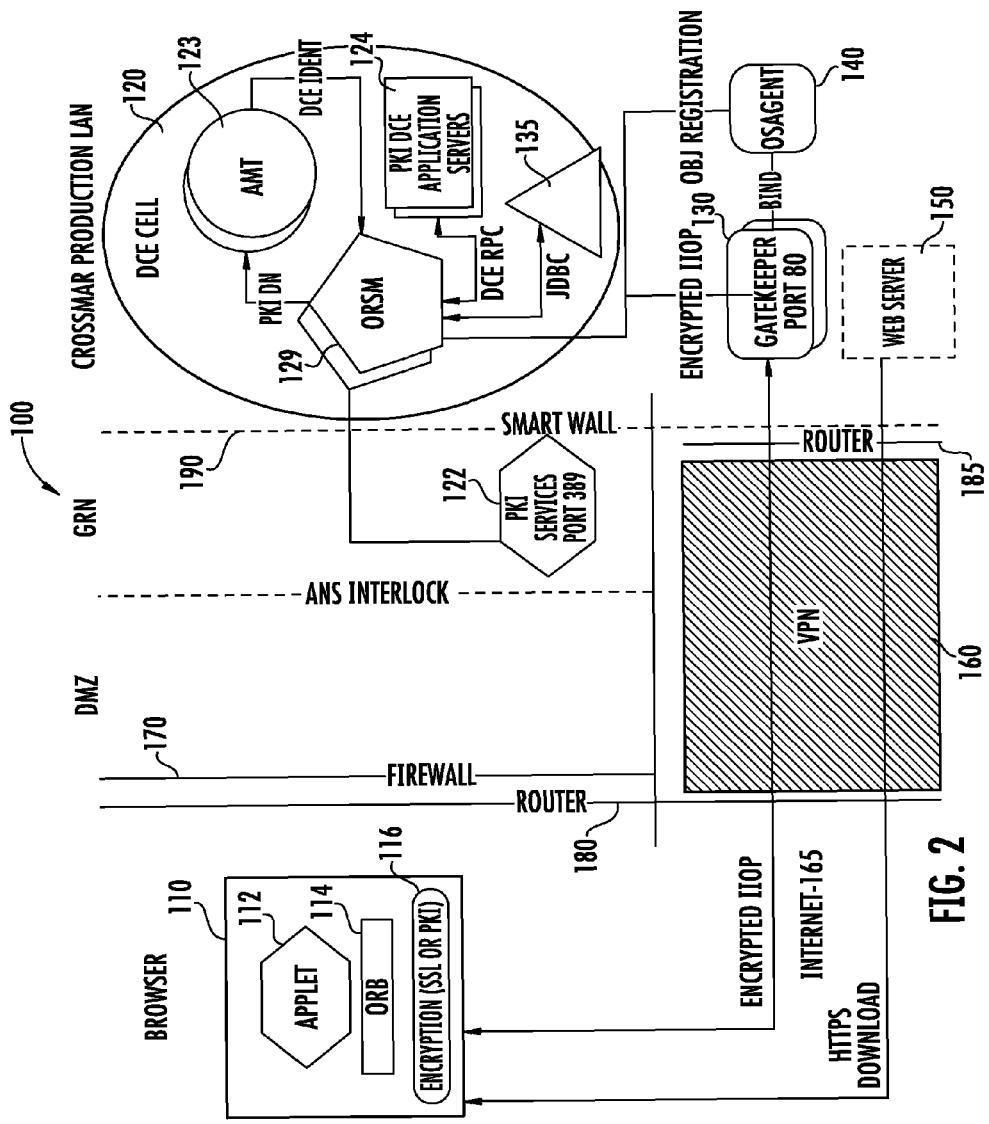
FIG. 2 depicts an overview of a secured system and method 100 for securely performing financial transactions over the Internet, according to an embodiment of the present invention.

Referring now to FIG. 2, which represents an overview of a secured system 100 and method thereof for securely performing financial transactions over the Internet, according to an embodiment of the present invention. The security 100 includes the following capabilities: two-factor authentication capability; operational capability with a web server, such as an Internet Information Server (IIS); integration with Distributed Computing Environment (DCE) security; firewall friendly (capability to communicate through firewalls); non-repudiation capability; encryption of confidential and restricted data transmitted over a non-secured network such that only authenticated users having access to the data; single entry of DCE user name and password for both software download and application execution; secure user authentication and software distribution through HTTPS connection with at least 128-bit encryption; integrated security architecture; and software distribution facility having automatic detection capabilities to determine what components are not installed and what components are obsolete and to perform minimal incremental setup.

To provide secure communication and financial transactions between the customer's browser 110 and the financial institution's system, the financial institution downloads or provides component-based applications for web clients/customers to use on their local machines. There are two kinds of components—security and communications common components, which include client components for secured communication, and application specific components. Each different financial application has one application specific component. Thus, if a user/customer wants to use a financial application made available by the financial institution, all the security and communications common components and the specific application's component must be installed on the customer's local computer. If the customer subsequently wants to use another available financial application, only the new application's specific component needs to be installed on the customer's local computer.

Hence, as shown in FIG. 2, the customer's browser 110 on the customer's local machine, such as a client PC, is provided with a number of component-based applications, including an application specific applet 112, Object Request Broker (ORB) software 114, and encryption software 116 with at least 128-bit encryption capability such as a SSL scheme or a PKI scheme like Entrust™ PKI. On the server side, the financial institution's system includes a financial transactions Local Area Network (LAN), which comprises a DCE cell 120, a gatekeeper having a port 130, an osagent 140, and a web server or IIS 150. Although the web server 150 is depicted outside the DCE cell 120 in FIG. 2 for ease of illustration, it actually resides in the DCE cell 120 to allow it to use DCE user name and password and authenticate clients for software download. The web server 150 contains a signed applet which is used to manage the download of application components specific to particular financial applications. This web server 150 also contains web client components in secure directories, which cannot be directly accessed by web clients/customers of the financial institution. These web client components are the aforementioned client components for secured communication that together constitute an object router client module in the client PC. This client module is discussed in more detail later.

With regard to the DCE cell 120, it further comprises an object router server module (ORSM) 129, such as the NetWeaver™ product made by NetNumina Solutions™, accessible by a PKI services port 122, an access management tool (AMT) 123 such as the Gradient Netcrusader™, DCE application servers 124 for storing the various financial applications offered by the financial institution, and a relational database management system 135 such as the Sybase™ system, which includes a SQL server, application programming interfaces (APIs) for programmers to develop code to access the data and stored procedures in the database, and administrative tools and utilities. It should be noted that the osagent 140, mentioned earlier, is part of the Object Request Broker (ORB) software within the ORSM 129. It provides object location and failure detection services; i.e., it helps client software find the IP address and port number of a server object.

In operation, the client computer having browser 110 accesses the financial institution's system via the Internet 165 and the institution's VPN 160. The VPN 160 is secured from the Internet by a firewall 170 such as the Cisco PIX™ firewall. Communication between the Internet and the VPN 160 is handled by a data router 180 such as a Cisco Router™. Communication between the VPN 160 and the financial institution's system is also handled by another data router 185 such as a Cisco Router™. The financial institution's system is further secured from the VPN 160 by a smartwall firewall 190 such as the V-One Smartwall™ product. The security features such as the PKI or SSL features are accessible through this firewall 190 to provide communication from the object router server module 129 as well as client communication tunneled through the gatekeeper and HTTPS.

It should be noted that the gatekeeper located at gatekeeper port 130 may be replicated to accommodate a large number of users or customers. The gatekeeper may be replicated, for example, on multiple machines or on the same machine. The gatekeeper will be started on a static port. For each instance/replication of the gatekeeper, a new port will be assigned. This port will be opened in the firewall 190 for traffic with a destination of the machine where the gatekeeper is running.

Figure 3:
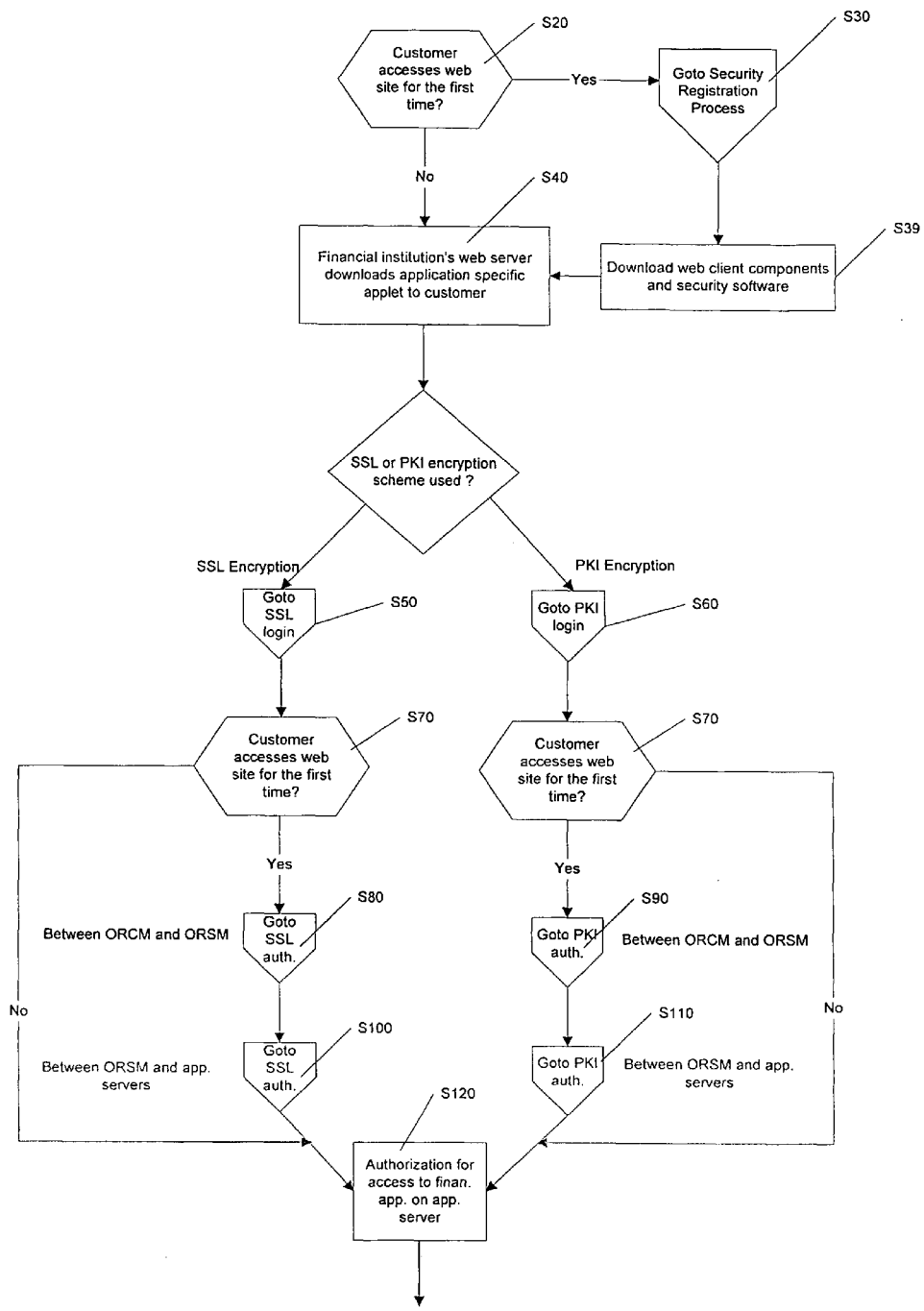
FIG. 3 depicts an overview flow diagram for securely connecting a customer's client machine to the financial institution's system to provide the customer with access to financial applications over a public data network, according to an embodiment of the present invention.
Figure 4:
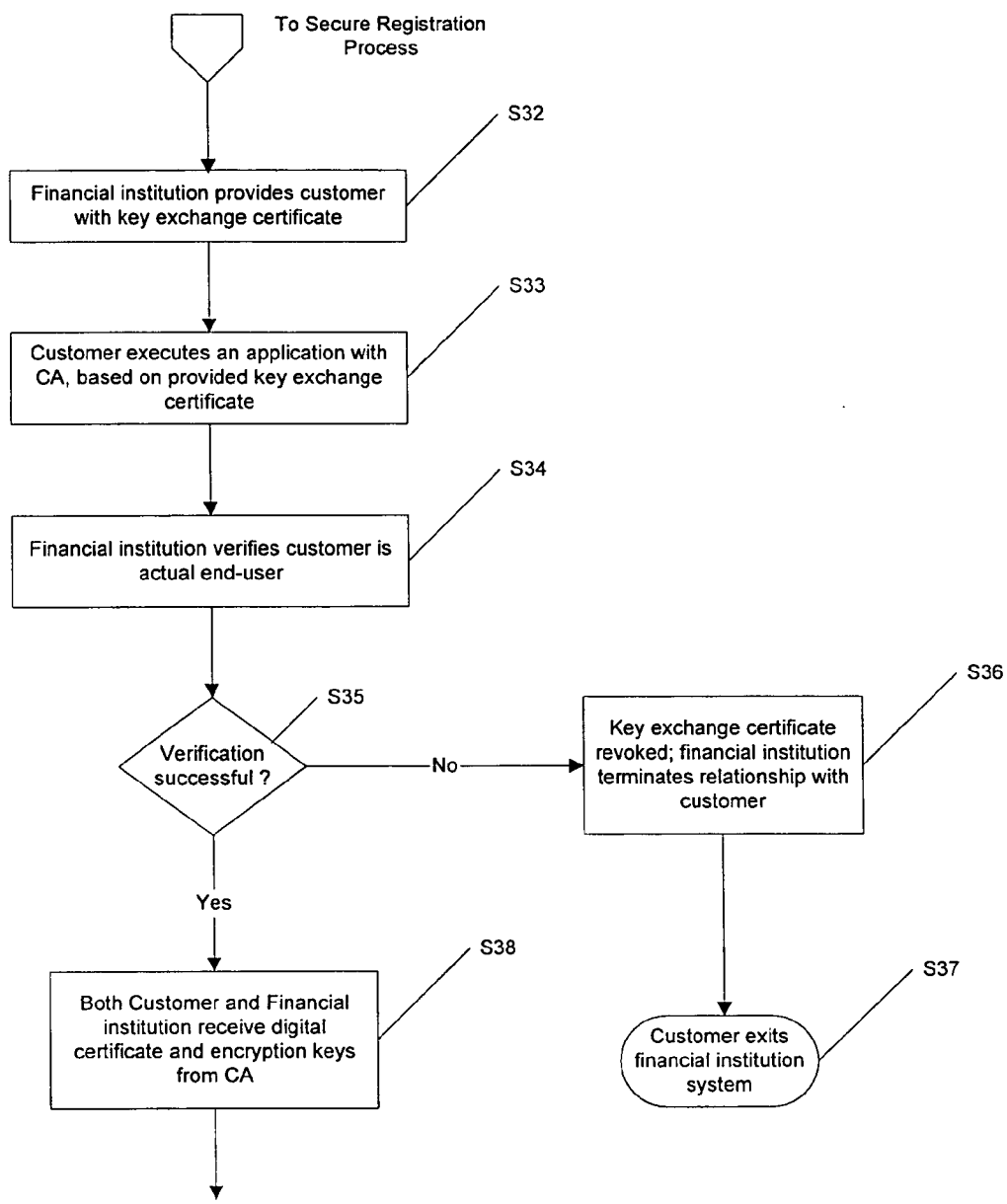
FIG. 4 depicts the secure registration process of FIG. 3, according to an embodiment of the present invention.

Referring now to FIG. 3, which shows an overview flow diagram for securely connecting a customer's client machine to the financial institution's system to provide the customer with access to financial applications over a public data network, according to an embodiment of the present invention. As mentioned earlier, when it is determined at S20 that the customer accesses for the first time the financial institution's web site or URL having the desired financial applications, the customer is initially authenticated through a secure registration process at S30. Referring now to FIG. 4, which shows a detailed flow diagram of the secure registration process, according to an embodiment of the present invention. This process is implemented by the financial institution through a Certificate Authority (CA) and includes providing new customer with a key exchange certificate at S32 so that communication during registration is secure. One possible way to delivering the key exchange certificate to the customer is via a postal service. At S33, the registration process further requires the new customer to execute an application with the CA to obtain a digital certificate and associated public, private and digital signature keys for end-user authentication purposes and for providing secure financial transactions over the Internet. The CA may be a third party CA or the financial institution itself working in the institution's environment to handle a number of functions, including: issuing digital certificates, revoking the digital certificates and maintaining the Certificate Revocation List (CRL).

During the registration process, the financial institution also verifies that the actual end-user executing the above registration procedure is the customer at S34. This verification can be done through a number of ways known to those skilled in the art. If the verification is unsuccessful, as queried at S35, the financial institution can revoke the issued key-exchange certificate and terminate the relationship with such end-user at S36 and S37. However, if the verification is successful at S35, the financial institution establishes a relationship with the customer and provides user name and password to the customer, with the CA issuing the necessary digital certificates and associated public, private and digital signature keys to both the customer and the financial institution for mutual authentication at S38.

Figure 5:
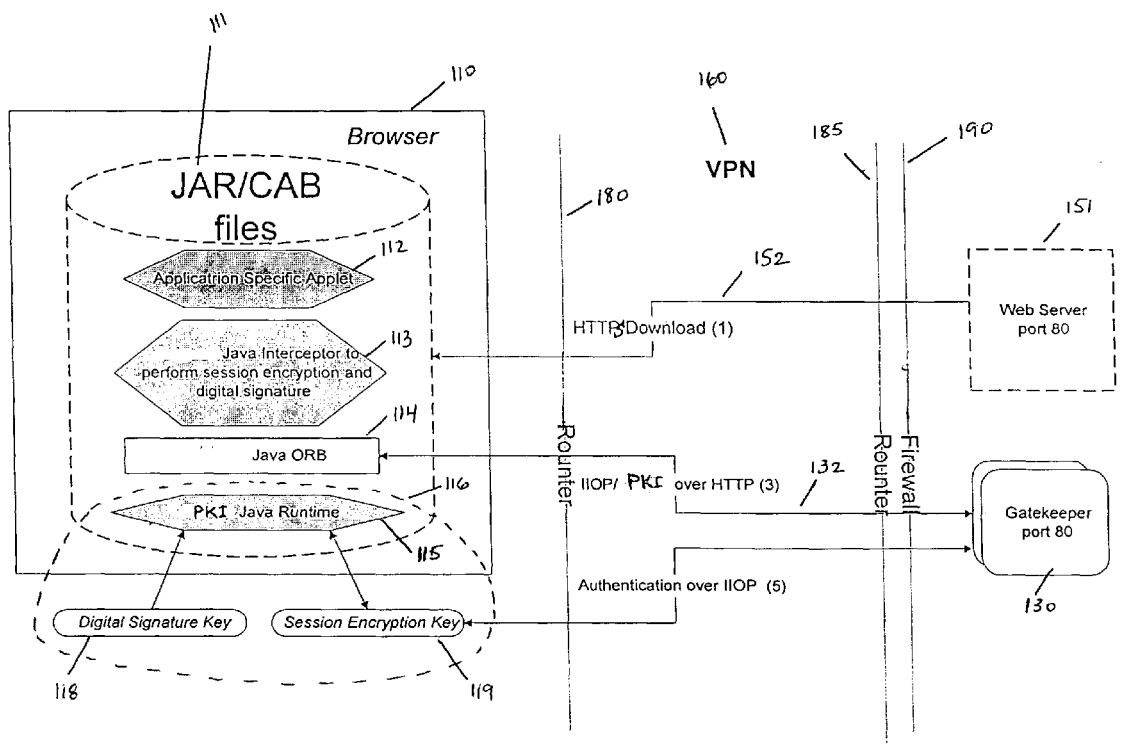
FIG. 5 depicts a detailed view of the client computer and browser 110 of FIG. 2, according to an embodiment of the present invention.

Referring back now to FIG. 3. Upon a successful registration process, the financial institution downloads security software and web client components to the client PC of the customer at S39. Additionally, the financial institution further downloads application specific applets to the client or customer's computer at S40. FIG. 5 provides a more detailed view of the client computer and browser 110 of FIG. 2, with like elements labeled with like numbers. As seen in FIG. 5, the client PC of the customer includes downloaded JAR- or CAB-extension files of the application specific applet 112, the Java Interceptor 113 to perform session encryption and digital signature, and the Java ORB 114. These files collectively constitute an object router client module (ORCM) 111 corresponding to the ORSM 129 residing on the financial institution's server side. The type of files for the ORCM 111 depends on the type of clients. For instance, for Visual Basic™ and Internet Explorer™ clients, the ORCM 111 will be packaged as one or more CAB files; for Netscape clients, one or more JAR files.

The client PC further includes the encryption-software 116. According to one embodiment of the present invention, the encryption software used is a PKI software, such as the Entrust™ PKI, with a client digital certificate previously installed in the client PC of the customer upon the successful registration process. As shown in FIG. B, the Entrust PKI includes Entrust Java Runtime 117, with associated digital signature key 118 and session encryption key 119, as a requirement for the ORCM 111 to run. According to another embodiment of the present invention, the encryption software 116 uses the SSL scheme developed by Netscape™.

Referring now to FIGS. 2, 3, and 5. As mentioned earlier, when a customer first requests a financial application from the financial institution's system, the customer initially makes an HTTPS connection to a HyperText Markup Language (HTML) page on the internal web server 150 that contains a signed applet, which is an application specific applet. This applet comprises a single sign-on component of the ORSM 129 as well as download manager client software. Upon this initial request by the customer, the signed applet specific to a desired financial application is HTTP downloaded at S40 from the web server 150, via its web server port 151 and connection 152 through the VPN 160 and the Internet, to the client PC. The signed applet now resides in the client PC as the application specific Java applet 112. The download of the Java applet 112 is not authenticated or encrypted. There is no need for encryption because there is no authentication. Nevertheless, data integrity is provided because the components are digitally signed. The single sign-on component and the download manager are in a single file that is cached by the client web browser 110 of the customer's PC. If a new release of this file is needed, the web browser 110 updates the cache, as described in further detail later.

The financial institution's system is now ready to login the customer at either S50 or S60. The Java virtual machine starts up. The HTML page of the downloaded application specific Java applet 112 lists the required files, which are specified as Java Properties, for running the desired financial application. These files include the aforementioned web client components constituting the ORCM 111, the application specific components, and the security software. The location of the client cache of the client machine is additionally specified by a Java Property, wherein the cache is designated as a directory relative to the client's Java virtual machine directory. The Java applet 112 checks this cache location to determine if any of the required files are missing or outdated. If any files are needed from the server of the financial institution, they will be downloaded upon the successful login by the customer. Once the cache is up to date, the browser is redirected to a local HTML file which is also stored and updated as part of the cache. This HTML file then loads the required application files directly from the client cache. The single sign on module used in both the download process and the application execution ensures that the user cannot load the local HTML, hence avoid the check for updated files. This is done by setting a flag during the download process indicating the local files are up to date. Upon stating the application, the single sign-on component checks and makes sure this flag is set.

Figure 6:
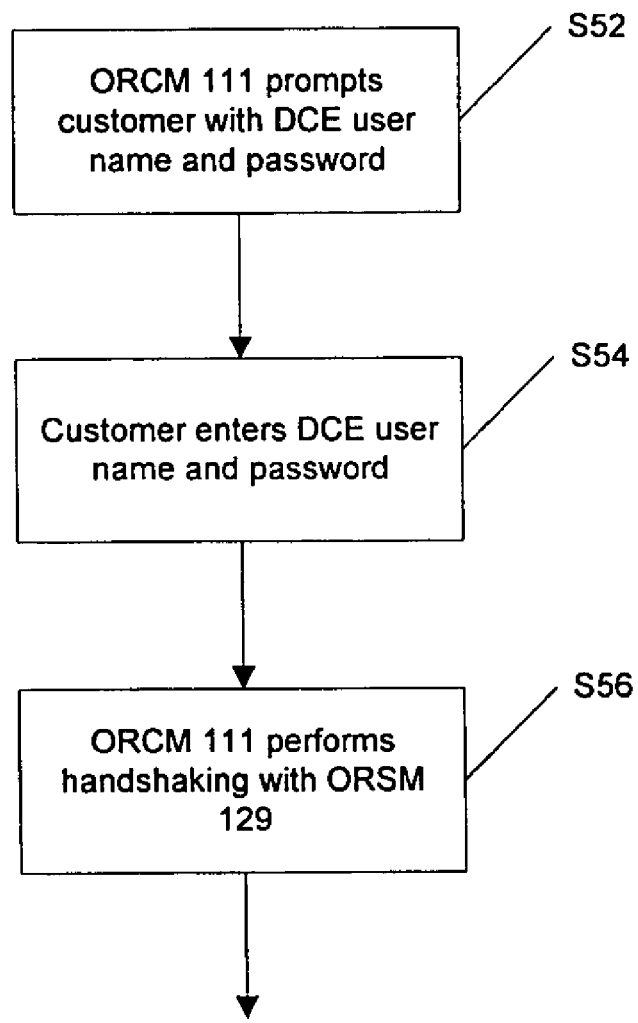
FIG. 6 depicts the Secure Sockets Layer (SSL) login process shown in FIG. 3, according to an embodiment of the present invention.

If a SSL encryption scheme is employed at S50 of FIG. 3, the SSL login process is shown in FIG. 6, according to one embodiment of the present invention. The ORCM 111 initiates the SSL environment with at least 128-bit encryption as established by Netscape™ to communicate with the ORSM 129 through HTTPS. The ORCM 111, through its downloaded Java applet 112, then prompts the customer to login with a DCE user name and password at S52. The ORCM 111 prompts a user to enter the DCE user name and password when either the ORCM 111 is initiated by a customer's login to request a financial application, as is the case here, or when there is a request to download one or more required files from the financial institution's system, as mentioned above. The DCE user name and password is established during the security registration process at S38 in FIG. 4. According to an embodiment of the present invention, if an expired password is detected, the user is forced to change the password. Additionally, upon a successful login, the ORCM 111 provides commands to display date and time of the last successful login, as well as the number of unsuccessful login attempts since the last successful login. Additional requirements for the password may also be implemented. For instance, a password may not be changed more than once in a specified time period, user accounts will be disabled after a specified number of consecutively failed login attempts, and there is a limit set for the number and type of characters allowed for a password. Upon the successful login at S54, the ORCM 111, through its applet 112, performs handshaking with the ORSM 129 at S56, using the gatekeeper port 130 as a communications proxy, to establish a session encryption key 119. Non-repudiation is not available with the SSL encryption scheme. The non-repudiation security feature ensures that the customer cannot deny participation in the transaction, for only the customer as the sender possesses the private key used to digitally sign the data that was sent to the financial institution's system.

Figure 7:
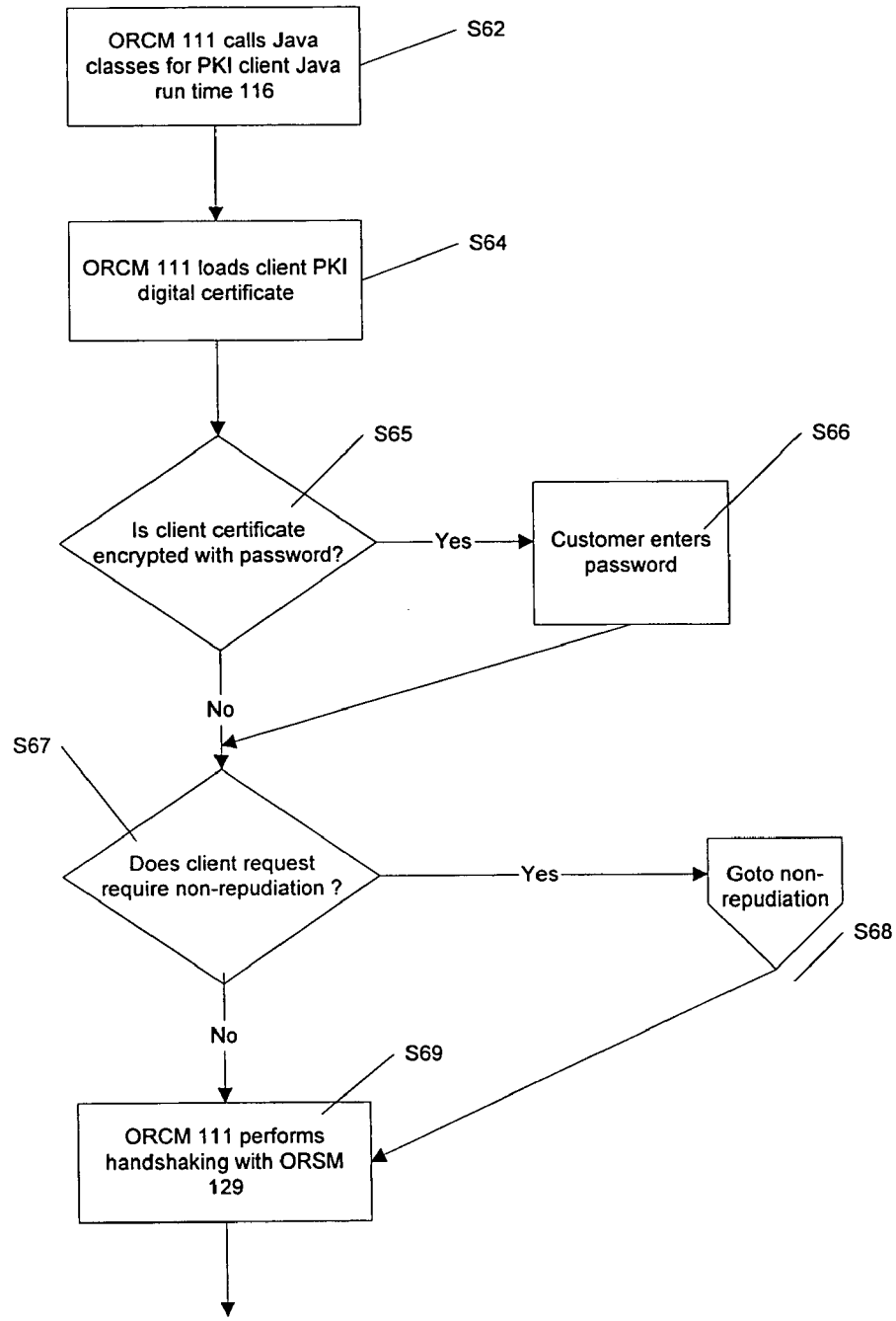
FIG. 7 depicts the Public Key Infrastructure (PKI) login process shown in FIG. 3, according to an embodiment of the present invention.

If a PKI encryption scheme such as Entrust™ is employed at login at S60 of FIG. 3, The PKI login is shown in detail in FIG. 7. At S62, the ORCM 111, through its applet 112, initializes the PKI environment by calling out to Java classes for the PKI Client Java run time 116. At S64, the client digital certificate (not shown) containing a digital signature key 118 is then loaded. The client certificate on the client computer can be encrypted with a password, as shown at S65. If so, the customer will be prompted for this password at S66. Additionally, any client requests that require non-repudiation will be digitally signed at this juncture at S67, as further explained below. With the PKI encryption scheme, the application specific Java applet 112 can communicate with the ORSM 129 via the gatekeeper port 130 and connection 132 using the Internet Inter-ORB Protocol (IIOP) secured with a PKI Session module, such as Entrust™/Session, directly or tunneled through HTTPS. The HTTPS tunneling is used when the aforementioned firewalls between the client and the server employ network address translation and port filtering. There is a configuration parameter that is set at deployment time in the applet's HTML file to turn HTTP tunneling on/off, with the off condition allowing the aforementioned IIOP communication between the Java applet 112 and the ORSM 129.

Figure 8:
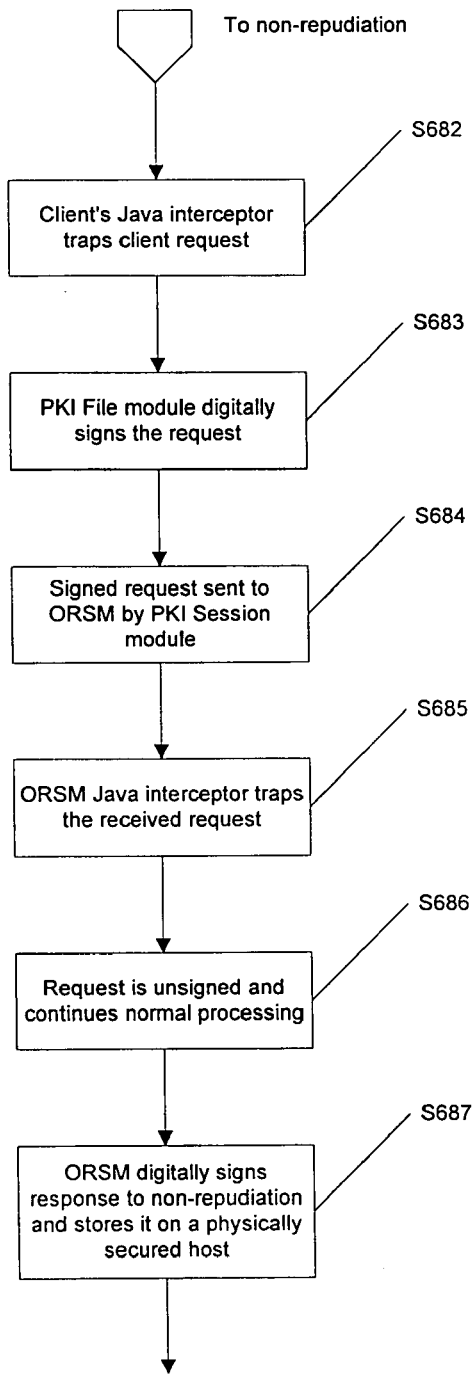
FIG. 8 depicts the non-repudiation process shown in FIG. 6.

Referring now to FIG. 8, which depicts a flow diagram of the non-repudiation process at S68 of FIG. 6. Once data of the IIOP request associated with a desired financial application is marshaled for transfer, the client's Java interceptor 113 is implemented to trap the request before the data is sent over the wire at S682. The client interceptor 113, such as Visigenic™ Java interceptor technology, makes use of a PKI File module, such as Entrust™/File technology, to digitally sign the request S683. Once signed, the data is shipped across over the wire by the Java ORB 114 using IIOP secured with a PKI Session module at S684, as mentioned above. When the request reaches the ORSM 129, a subsequent server interceptor is implemented to trap the request before the data is unmarshaled at S685. The request is logged in the SQL developments tool system 135 on the physically secured host, along with a timestamp. At S686, The request is then unsigned by making a call against the PKI file module and allowed to continue processing as normal. The response to the non-repudiation requirement at S67 of FIG. 7 is digitally signed by the ORSM 129 and logged in the SQL developments tool system 135 on the physically secured host at S687, along with a timestamp.

Using either direct IIOP connection or tunneled-through HTTPS protocols, the client computer of the customer connects through the routers 180 and 185, the VPN 160, the firewall 170 and the smartwall 190 to the gatekeeper port 130. The gatekeeper port 130 then proxies the secured request intact to the appropriate ORSM 129 after removing the HTTP wrapper for connection to the appropriate financial application in the DCE application servers 124 that corresponds to the application specific Java applet 112.

Figure 9:
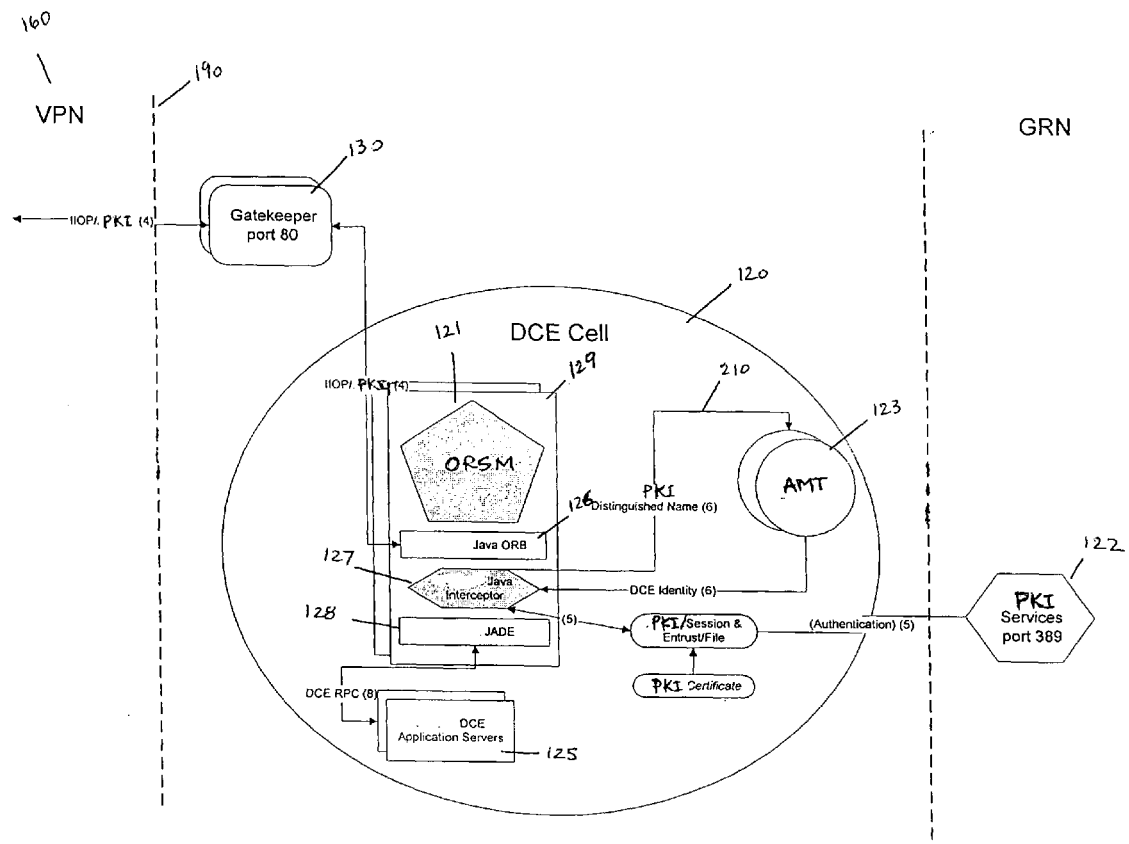
FIG. 9 depicts a detailed view of the financial institution's server side of FIG. 2, according to an embodiment of the present invention.

FIG. 9 provides a more detailed view of the financial institution's system of FIG. 2, with like elements labeled with like numbers. As shown in FIGS. 2, 5 and 9, the ORSM 129 in the DCE cell 120 comprises an object router 121, a Java ORB component 126, a Java interceptor component 127 which is the server interceptor mentioned earlier, and a Java-to-DCE access component 128 such as a Gradient™ Java And DCE (JADE) component. JADE is a Gradient™ specification for making DCE calls from the Java programming language; thus, a Gradient™ JADE component implements the specification and makes it easier for Java programmers to access DCE API functions.

Upon receiving a request from the client computer of the customer for the first time, as determined at S70's of FIG. 3, mutual two-factor authentication takes place between the ORCM 111 of the client browser 110 and the ORSM 129. It should be noted that there is no authentication between the client browser 110 and the gatekeeper at port 130. Thus, the client application request is passed along intact from the client browser 110, through the gatekeeper port 130, and on to the object router server components. Consequently, there are several IIOP calls that are executed at this juncture between the client browser 110 and the ORSM 129 to perform this authentication process. These take place "under the covers"; in other words, no application-level code is required for them.

Figure 10:
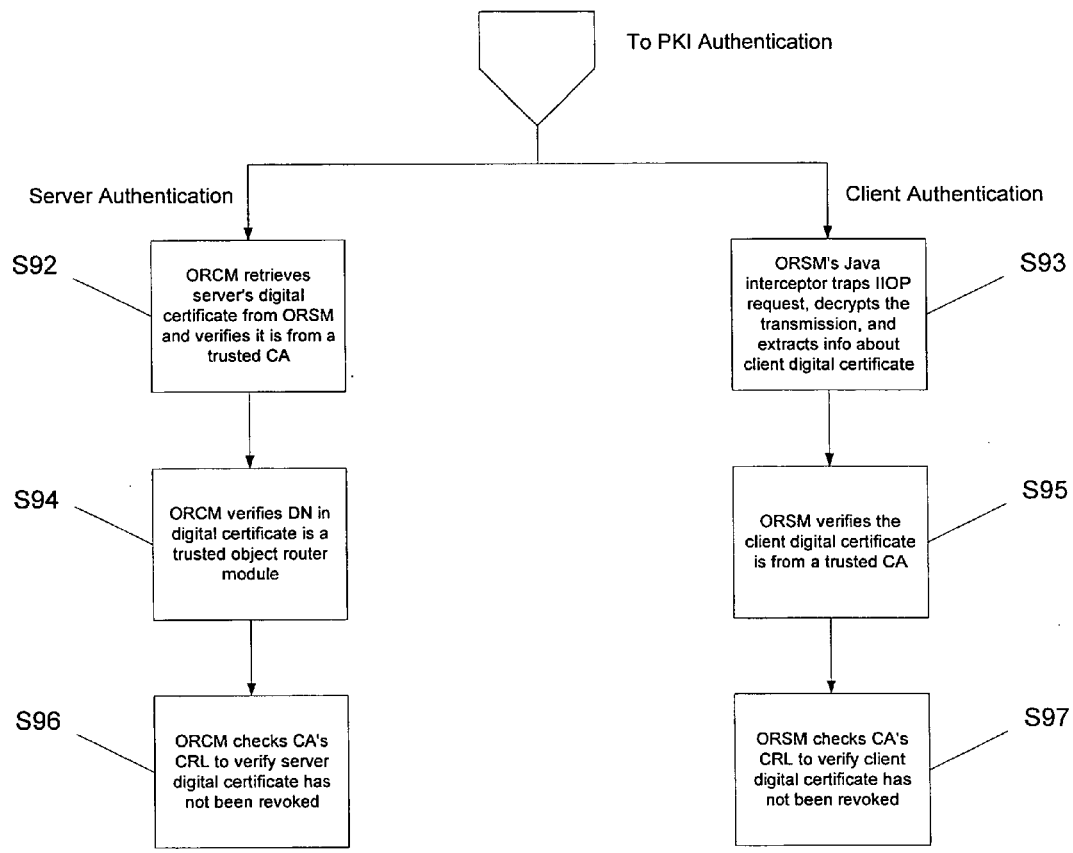
FIG. 10 depicts the PKI authentication process between the Object Router Client Module (ORCM) 111 and Object Router Server Module (ORSM) 129.

If a PKI encryption scheme such as the Entrust™ PKI is employed for authentication at S90, FIG. 10 provides a detailed flow diagram of the PKI authentication process between the ORCM 111 and ORSM 129, according to an embodiment of the present invention. Referring to FIG. 10, both the ORSM 129 and the ORCM 111 (through its client Java applet 112) contact the PKI services such as the Entrust Services to authenticate each other's digital certificates to ensure that they come from a valid CA, and are not on the CRL of the CA. Specifically, for server authentication at S92 the ORCM 111 verifies the server's digital certificate of the financial institution retrieved from the ORSM 129 is from a trusted CA. At S94, the ORCM 111 verifies the Distinguished Name (DN) contained in the certificate is a trusted object router module. At S96, the ORCM 111 also checks the CRL to ensure that this digital certificate has not been revoked. These two tasks are accomplished by communicating directly with the PKI servers at the financial institution through the PKI services port 122. For client authentication at S93, server-side interceptor 127 is used to trap the IIOP request, decrypt the transmission, and extract the PKI credentials characterizing the client digital certificate. At S95, the ORSM 129 then verifies that the digital certificate retrieved from the client computer, via the IIOP request, is from a trusted CA. At S97, the ORSM 129 also checks against a current CRL of the CA to make sure the digital certificate has not been compromised or revoked. Again, these two tasks are accomplished by communicating directly with the PKI servers within the financial institution. Furthermore, certain requests require a process for non-repudiation. It is at this juncture during these requests that the ORSM 129 makes appropriate calls against the PKI File module to validate the client's digital signature and, via the DCE Remote Procedure Call (RPC), store the digitally signed information in a physically secured database.

Figure 11:
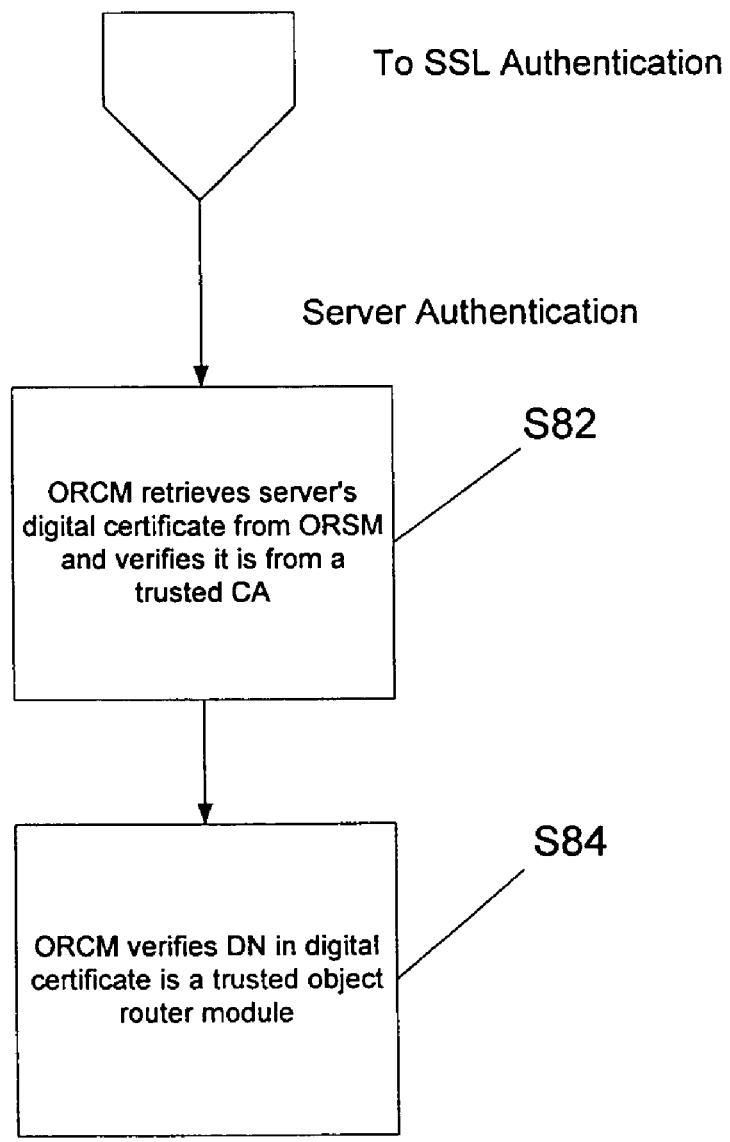
FIG. 11 depicts the SSL authentication process between ORCM 111 and ORSM 129.

If the SSL encryption scheme is employed at S80 of FIG. 3, FIG. 11 provides a detailed flow diagram of the SSL authentication process between ORCM 111 and ORSM 129. Referring to FIG. 11, only the ORCM 111 will validate the server digital certificate of the financial institution using a local public key deployed with the application. Specifically at S82, the ORCM 111 verifies the digital certificate retrieved from the ORSM 129 is from a trusted CA. The list of trusted CAs is provided to the client computer as part of the HTTPS download from the web server 150 of the financial institution. The ORCM 111 also verifies the DN contained in the certificate is a trusted object router module. No checking is done to see if the certificate has been revoked.

There is also an authentication process between the ORSM 129 and the DCE application servers 124, as indicated by S100 and S110 in FIG. 3. If the PKI encryption scheme is employed for this authentication process, the ORSM 129 uses DCE authentication to verify the DCE application servers 124 with which it is communicating. To perform this verification, the ORSM 129 uses the client's DCE user credentials to authenticate against the DCE servers 124. The server's Java interceptor 127 is used to establish DCE user credentials for the proper client principal in the following manner. the Java interceptor 127 provides the AMT 123 with the PKI DN, which denotes the user name and other identifying attributes of the customer, extracted from the client request during the aforementioned authentication process. The AMT 123 then maps the DN into DCE user credentials and returns this to the Java interceptor 127 of the ORSM 129 to complete authentication. The ORSM 129 also caches the security information returned by the AMT 123 in random access memory (RAM) for use during later requests. Next, the DCE application servers 124 authenticate the web client/customer, using the DCE user credentials passed on by the ORSM 129, as further described in detail later.

If the SSL encryption scheme is employed, the ORSM 129 also uses DCE authentication to verify the application servers 124 with which it is communicating. To perform this verification, the ORSM 129 also utilizes the client's DCE user credentials to authenticate against the DCE servers 124. The DCE user credentials are established by the ORSM 129 from the DCE user name and password provided by the ORCM 111 during the handshake mentioned earlier. Next, The DCE application servers 124 authenticate the web client/customer using the DCE user credentials passed on by the ORSM 129, as further described in detail next. This security information will be cached based on session ID in RAM for use during later requests.

Upon establishing the DCE user credentials with either the PKI or SSL encryption scheme, the ORSM 129 translates the IIOP request at connection 132 into a secure DCE request utilizing such DCE credentials and subsequently performing datatype mapping between the IIOP and DCE protocols. Specifically, the DN contained in the client digital certificate is mapped to a DCE principal. At S120, If no mapping exists the client/customer will not be granted access to the DCE application servers 124 and the stored financial applications. Access to the DCE application servers 124 and RPCs is managed in the DCE security server (not shown) of the AMT 123 using Access Control List (ACL) management. Access control to application servers 124 by clients (either end-users or other RPC servers) is granulated to the level of RPC servers and individual RPCs within the servers. Each application has a built-in authorization mechanism that uses the USERID, extracted by the application RPC server from the DCE credentials of the user/customer, to identify entitlements. Entitlement setting is restricted to authorized application administrators.

The ORSM 129 then propagates the secured request along to the DCE application servers 124. Intranet communication between the ORSM 129 and the DCE application servers 124 is also encrypted. However, this Intranet encryption may be of a lower-bit type than that used in the encryption for IIOP communication over the Internet between the client browser 110 and the ORSM 129, as the security risk is less in the Intranet environment.

Upon subsequent requests by the client computer for a financial application from the DCE application servers 125, all runtime components would have been downloaded off the financial institution's system and are executing. Additionally, when a web page or Java class file associated with the desired financial application is requested, the browser will check the cache first. If the document is found in the cache, the browser will (either once per session or every time) validate this document is up to date. To check to see if the document is up to date, the browser will request the document from the web server 150, and if the document has not been updated, the browser will use the file in the cache. The application request itself will trigger the client-side Java interceptor 113 to encrypt the data using a PKI session such as Entrust/Session and, if required, digitally sign the request with Entrust/File before sending it off. As mentioned earlier, the application specific applet 112 can communicate with the ORSM 129 using IIOP and Entrust/Session directly or tunneled through HTTPS to connect through the front-line firewall 170 and the VPN 160 to the gatekeeper port 130. Next, the gatekeeper port 130 talks IIOP and Entrust/Session to the ORSM 129, which then accepts the IIOP request and the PKI security information. Since this request is coming from a previously authenticated user, the ORSM 129 simply validates the authentication context, decrypts and validates the integrity of the message utilizing Entrust/Session Application Program Interfaces (APIs) and passes the request along using cached DCE credentials. If the request requires non-repudiation, the ORSM 129 additionally validates the digital signature using Entrust/File and store the appropriate information. Next, the ORSM 129 performs data type mapping from IIOP to DCE elements and propagates a secured request along to the DCE application servers 124. The customer now has access to a secure environment over the Internet to perform the desired financial transaction from the financial institution's server.

Although the invention has been described with reference to these preferred embodiments, other embodiments can achieve the same results. Variations and modifications of the present invention will be apparent to one skilled in the art, and the above disclosure is intended to cover all such modifications and equivalents.

The invention claimed is:

1. A method for securely providing a financial application over a public data network (PDN), comprising:
   receiving a request for a financial application over a PDN from a first location;
   directing the request to a secure electronic site;
   determining whether the request for the financial application has been received before;
   registering the request through a secure registration process contingent on the request for the financial application not having been received before, comprising:
      providing a key exchange certificate in response to the request; and
      requesting and receiving a digital certificate from a certificate authority;
   preparing a response to the request;
   transmitting software specific to the requested financial application over the PDN to the first location for executing a financial application;
   transmitting security software over the PDN to the first location to provide security for a response to the request;
   securely processing the request over the PDN with the software specific to the requested financial application and security software;
   wherein transmitting the security software is contingent upon a success of the secure registration process.

2. The method of claim 1, wherein the PDN is the Internet.

3. The method of claim 1, wherein securely processing the request over the PDN with the software specific to the requested financial application and security software comprises:
   requesting a user name and password with regard to the request for the financial application;
   receiving the user name and password; and
   verifying the user name and password are correct before continuing with processing the request.

4. The method of claim 1, wherein securely processing the request over the PDN with the software specific to the requested financial application and security software further comprises:
   requesting a user name and password with regard to the request for the financial application;
   receiving the user name and password;
   verifying the user name and password; and
   updating the supporting software for the requested financial application as determined by the software specific to the requested financial application;
   wherein updating the supporting software is contingent on successfully verifying the user name and password.

5. The method of claim 1, wherein securely processing the request over the PDN with the software specific to the requested financial application and security software comprises:
   determining whether the request for the financial application requires non-repudiation.

6. The method of claim 3, further comprising:
   determining whether the request for the financial application has been received before; and
   transmitting the received digital certificate for verification over the PDN;
   wherein transmitting the received digital certificate is contingent on the request for the financial application not having been received before.

7. The method of claim 6, wherein requesting and receiving a digital certificate from a certificate authority comprises:
   receiving the digital certificate associated with the request for the financial application; and
   verifying the digital certificate to ensure that the digital certificate comes from a trusted certificate authority;
   wherein verifying the digital certificate is contingent on the request for the financial application not having been received before.

8. The method of claim 1, wherein the financial application includes at least one application for foreign exchange trading.

9. The method of claim 1, wherein the financial application includes at least one application for providing settlement instructions and/or performing allocations and splits.

10. The method of claim 1, wherein the financial application includes at least one application for remotely and electronically purchase and sell warrants.

11. A method for securely providing at least one financial application over a public data network (PDN), comprising:
   providing at least one application storage space for securely storing at least one financial application;
   providing a location on the public data network where requests for the at least one financial application can be made;
   upon receiving a request for the at least one financial application from a first location, providing software specific to the at least one financial application and security applications having digital signature and session encryption capabilities and keys for authentication and digital signature over the PDN to the first location for the request, wherein providing security applications comprises:
providing a key exchange certificate; and
providing a digital certificate with associated encryption keys based on verification of the key exchange certificate.

12. The method of claim 11, further comprising:
providing a second server for storing at least some of the security applications for securely accessing the at least one financial application over the PDN.

13. The method of claim 11, further comprising:
establishing a user name and password for the request for the at least one financial application.

14. The method of claim 11, wherein providing the security applications is conditioned upon a determination that the request for the at least one financial application had not been previously received.

15. The method of claim 11, further comprising:
using the security applications to establish an encrypted communication link over the PDN.

16. The method of claim 14, further comprising:
receiving a user name and password associated with the request.

17. The method of claim 11, further comprising:
establishing a password for the digital certificate.

18. The method of claim 17, further comprising:
determining whether the request for the at least one financial application requires performing non-repudiation.

19. The method of claim 18, wherein performing non-repudiation comprises:
receiving the request for the at least one financial application in a digitally-signed format;
validating a digital signature contained in the digitally-signed request.

20. The method of claim 17, further comprising:
authenticating with the at least one application storage space as a prerequisite for accessing the at least one financial application.

21. The method of claim 11, wherein the at least one financial application includes at least one application for foreign exchange trading.

22. The method of claim 11, wherein the at least one financial application includes at least one application for providing settlement instructions and/or performing allocations and splits.

23. The method of claim 11, wherein the financial application includes at least one application for remotely and electronically purchase and sell warrants.

* * * * *

UNITED STATES PATENT AND TRADEMARK OFFICE
CERTIFICATE OF CORRECTION

| | | |
|---|---|---|
| PATENT NO. | : 7,716,109 B1 | Page 1 of 1 |
| APPLICATION NO. | : 09/560960 | |
| DATED | : May 11, 2010 | |
| INVENTOR(S) | : David M. Jacobs et al. | |

It is certified that error appears in the above-identified patent and that said Letters Patent is hereby corrected as shown below:

On the Title Page; item (75);

Correct the citizenship of Imran Sayeed from US to PK.

Signed and Sealed this
Twenty-sixth Day of July, 2011

David J. Kappos
*Director of the United States Patent and Trademark Office*